J. Sissons,
Ice Cream Freezer.
No. 90,594.          Patented May 25, 1869.
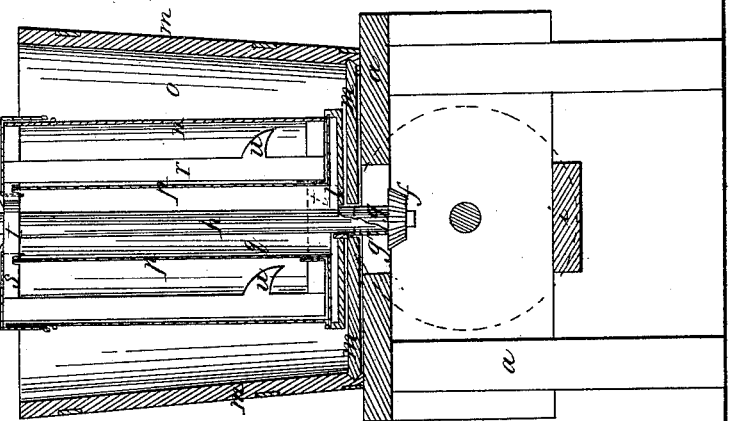
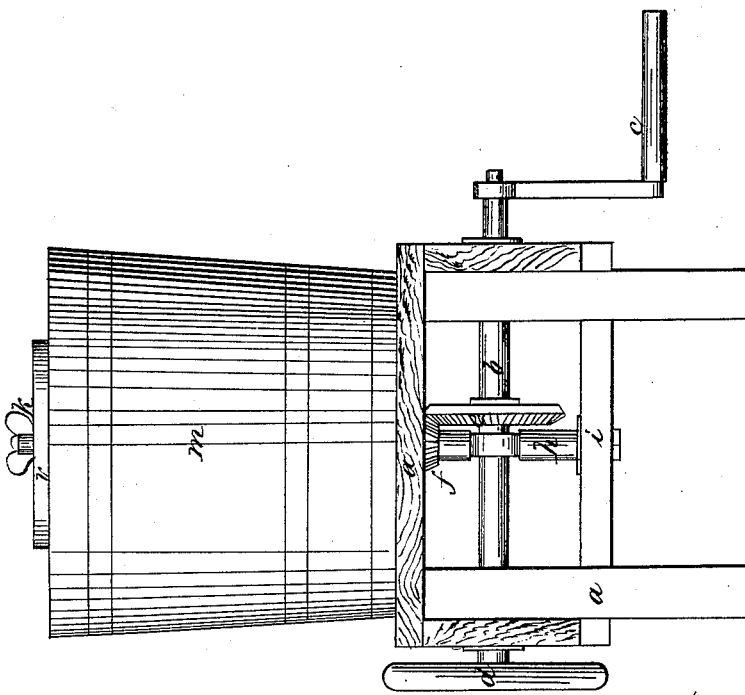
Witnesses         Inventor

United States Patent Office.

JOSEPH SISSONS, OF HORNCASTLE, ENGLAND.

Letters Patent No. 90,594, dated May 25, 1869.

IMPROVED ICE-CREAM FREEZER.

The Schedule referred to in these Letters Patent and making part of the same

*To all whom it may concern:*

Be it known that I, JOSEPH SISSONS, of the town of Horncastle, in Lincolnshire, England, and a subject of the Crown of Great Britain, have invented new and useful "Improvements in Ice-Cream Freezers;" and I do hereby declare that the following is a full, clear, and exact description of the construction and operation of the same, in such terms as to enable a person skilled in the art to manufacture and use the same, reference being had to the annexed drawings, where—

Figure 1 represents a side elevation of the ice-cream freezer.

Figure 2 represents a vertical section through the freezer, showing the knives, or scrapers.

The object of this invention is to provide for public use an apparatus which will freeze cream in a less time than by the ordinary freezers now in use, while, at the same time, it produces a finer article of manufactured ice-cream than has heretofore been made by machines for a similar purpose. To this end, The invention consists in the arrangement and construction of the various parts composing the device, as will be hereinafter more fully described.

In the drawings, hereto attached, similar letters of reference indicate corresponding parts.

Letter $a$ is a portable stand, or table, of any convenient size, and which supports the freezer. It may be of wood, or metal, or of both combined, and it also serves to carry or hold in place the various parts of the driving-machinery.

$b$ is a revolving shaft, actuated by the crank $c$.

It is provided with a fly-wheel, $d$, at its opposite end, and, near its centre, with the bevelled-gear wheel $e$, working into a second bevelled-gear wheel, $f$.

This wheel $f$ is attached to a cylindrical shaft, or collar, $g$, through which a second solid shaft, $h$, passes freely.

This solid shaft $h$ is stationary, and passes from the bearing in cross-bar $i$ to the upper end of the freezer, through the internal cylinder, presently to be described.

The shaft, or bar terminates at its upper end in a square end for the reception of the upper cross-bar of the knives and top cover of freezer, and is provided with a suitable fastening-nut.

The revolving collar $g$ is attached to a circular bracket, $l$, which is provided on its outside with a groove, or checked recess, for the reception of the lower edge of the freezer-cylinder with the bracket.

$m$ is the external casing, or tub of the freezer.

$n$ is a cylinder of tin, of less diameter, leaving a void space, $o$, for the reception of the ice, &c., as before stated.

This cylinder revolves on the bottom bracket $i$.

$p$ is the internal cylinder, also of tin, connected to and revolving with the cylinder $n$, and, together with it, constituting the freezer for the cream itself, enclosing the vertical shaft $h$, also of suitable size for the reception of additional ice, in the void space $q$.

In the space between the two cylinders $n$ and $p$, the cream is placed, and surrounded on both sides with the congealing-substances.

For the purpose of scraping or removing the frozen cream from the sides of the two cylinders, the knives $r\ r$ are arranged in such a manner as to come in contact with the sides of the revolving cylinders in their entire height.

The vertical knives are connected together at the top by the cross-bar $s$, which is provided with a square hole for the reception of the square end of shaft $h$, and on the bottom by the ring $t$.

On the sides of the knives are arranged beaters, $u\ u$, for the purpose of agitating the cream, and making it light and smooth.

$v$ is a circular cover, for closing the upper end of the freezer, and to which the knives are attached.

This cover is secured to the stationary shaft $h$ by the nut K, and is stationary while the freezer revolves.

Having now described the various parts of my invention, to which I have given the name of "Sissons' Arctic Ice-Cream Freezer," I will proceed to give a more particular description of its mode of working.

The apparatus being arranged substantially as described, the cover $v$ is removed, and the cream is introduced into the freezer, in whatever quantity required. The cover is then replaced, and the void spaces $o$ and $q$ filled with ice or other congealing-substance. Motion is then given to the freezer by means of the crank $c$, wheels $e$ and $f$, collar $g$, and bracket $i$. As the freezer revolves, the stationary knives $r\ r$ scrape off the partially-frozen cream from the sides, and, with the aid of the beaters $u$, reduce the whole to a light homogeneous mass, the freezing-process still continuing, together with the action of the knives.

The cream will be found sufficiently frozen in a few minutes. The cover $v$ is then taken off, and the freezer taken out of the tub, and its contents removed, to be replaced with a fresh supply of cream, and the process repeated.

I claim as my invention, and wish to secure by Letters Patent—

The construction and arrangement of the frame $a$, vessel $m$, crank $c$, fly-wheel $d$, shaft $b$, wheels $e\ f$, stationary shaft $h$, sleeve $g$, bracket $l$, rotating cylinders $n\ p$, and stationary knives or scrapers $r\ r$, when combined and operating substantially as and for the purposes herein set forth.

JOSEPH SISSONS.

Witnesses:
CHARLES LEGGE,
CHARLES G. C. SIMPSON.